United States Patent [19]

Hagens et al.

[11] 4,420,578
[45] Dec. 13, 1983

[54] SURFACE TREATMENT OF GLASS CONTAINERS

[75] Inventors: Rodger G. Hagens, Hamilton; Dominic K. Hui, Oakville, both of Canada

[73] Assignee: Diversey Corporation, Mississauga, Canada

[21] Appl. No.: 302,303

[22] Filed: Sep. 14, 1981

Related U.S. Application Data

[63] Continuation-in-part of Ser. No. 205,091, Nov. 10, 1980, abandoned.

[51] Int. Cl.³ .............................................. C08K 5/09
[52] U.S. Cl. .................................... 524/322; 524/236; 524/262; 427/421; 427/154
[58] Field of Search ............... 524/262, 266, 268, 320, 524/322, 236

[56] References Cited

U.S. PATENT DOCUMENTS 3,686,357 8/1972 Cheeseman ......................... 428/429
4,191,817 3/1980 Schiller ............................... 428/429

Primary Examiner—Paul R. Michl
Attorney, Agent, or Firm—Merriam, Marshall & Bicknell

[57] ABSTRACT

Returnable glass bottles, particularly beverage bottles, having a natural glass surface, unmodified by a hot end process coating, having a quick curing thin coating of an amino functional polydimethylsiloxane, which does not visually change the appearance of the bottles applied to the exterior surface to increase lubricity and scratch resistance to said bottles. The coating is removable when the bottles are washed with an aqueous caustic solution. A new one-trip coating can then be applied.

4 Claims, No Drawings

SURFACE TREATMENT OF GLASS CONTAINERS

This application is a continuation-in-part of our copending application Ser. No. 205,091 filed Nov. 10, 1980, now abandoned.

This invention relates to protecting glass articles against scuffing and scratching. More particularly, this invention is concerned with novel processes of coating glass articles, particularly food and beverage bottles, against scuffing and scratching, with an amino functional polydimethylsiloxane coating and novel compositions containing such material which are useful in such processes.

It is well known that glass articles, such as glass bottles, are handled a great number of times during shipping, filling, use, etc., and that during such handling the bottles come in contact with various mechanical devices and with other bottles. This high degree of contact causes breakage as well as marring, scratching and defacing of the exterior surfaces of the bottles. This defacement or scuffing is aesthetically unattractive.

In the art as exemplified by Canadian Pat. No. 703,598, it is known that when glass containers are treated at a high temperature with a metal compound, for example tin tetrachloride or certain organic titanium compounds, and after annealing the containers are further treated with an amine, such treated glass containers possess surfaces having a high degree of lubricity and abrasion resistance, so that when brought into contact with one another during the handling and filling operations, the containers slide smoothly against each other and the glass does not become abraded or damaged. A substantial number of organic compounds are known for treating glass containers after such annealing process. Such compounds for overcoating include polyethylene glycols, esters of polyethylene glycols, polyethylenes, fatty acids, amines, as well as many others known in the art as see, for example, Canadian patent 1,041,846 and U.S. Pat. Nos. 2,995,533; 3,352,707; 3,438,801; 3,598,632 and 3,873,352. Japanese patent 54-32521 issued in 1979 to Kokai Tokkyo Koto discloses that the use of certain quaternary ammonium chlorides as coatings on bottles provides satisfactory slipperiness to the bottles when wet or dry.

Even the most effective of the organic coatings of the prior art will offer only limited protection against repeated alkaline or caustic washings. It has been found that after only a few washes in dilute sodium hydroxide solution at 75° C., the organic coating is largely removed or deteriorated. This applies to coatings put directly onto the glass or put onto the inorganic metal oxide coating. In the latter case, the metal oxide coating becomes degraded by the washing resulting in the glass surface blooming and becoming unsightly, non-lubricious and susceptible to damage by abrasion. Thus, it would be pointless to apply the above mentioned treatment to returnable bottles, such as those used for beer, soft drinks, or milk, which may have an average usage of up to 60 times.

In addition to these problems, it is also well known that the titanium and tin compounds previously referred to, which are applied to the hot glassware during manufacture (the so called "hot end coatings") have a number of drawbacks. The titanium compounds are difficult to apply uniformly and the tin compounds, while easier to apply, have become increasingly costly in recent years.

Up till this time therefore, there has been no suitable way of chemically treating returnable glass bottles to reduce the rate of scuffing and wear or to retain lubricity for the lifetime of the bottle. Thus, there has been a need to provide a suitable coating for returnable glass bottles which may be easily applied to provide scuff and scratch resistance as well as to furnish adequate lubricity to the bottles and which coating serves as a one trip coating which on return of the bottles is readily removable during the alkali washing procedure.

Yokokura et al U.S. Pat. No. 4,273,834 discloses a scuff-masking composition for glass vessels comprising specific organopolysiloxanes and a curing catalyst. The coating, after application to glass vessels, requires 0.5 to 5 hours to cure. That is much too long for successful coating on a bottle cleaning and filling line.

According to one aspect of the subject invention, a novel process is provided for protecting the natural glass surface, unmodified by a hot-end process coating, of returnable food and beverage bottles against scuffing and scratching, which comprises applying a liquid product containing an amino functional polydimethylsiloxane to the surface of the glass bottles to thereby deposit a thin liquid film thereon which is quickly curable to a solid coating which is colorless, clear, lubricious, clean to the touch, nonsticky and removable by a caustic wash. The bottle retains its pristine, normal appearance and is essentially unmodified in appearance as a result of the treatment.

Amino functional polydimethylsiloxanes (sometimes referred to herein as siloxanes and polysiloxanes) which can be suitably employed in the process are commercially available. Thus, Dow Corning Corporation markets several products which can be used, including their products identified as DC 531, DC 536 and DC-478. Furthermore, amino functional polydimethylsiloxanes are disclosed in the prior art as see, for example, U.S. Pat. Nos. 3,460,981, 3,508,933 and 3,836,371.

The amino functional polydimethylsiloxanes particularly useful in the process of the invention are produced by combining (A) a hydroxyl endblocked polydimethylsiloxane having a viscosity of about 10 to 15,000 cs, preferably about 30 to 1000 cs, at 25° C. with (B) a silane of the formula $(RO)_3SiR_1NHR_2$ or $(RO)_3SiR_1NHCH_2CH_2NH_2$ wherein R is an alkyl group having 1 to 4 carbon atoms, $R_1$ is a divalent saturated hydrocarbon radical having 2 to 4 carbon atoms and $R_2$ is hydrogen or a methyl group. Optionally, (C) a silane having the formula $X_3 Si Z$ wherein X is a $C_1$–$C_4$ alkoxy or $C_1$–$C_4$ acyloxy group and Z is a nonhydrolyzable radical, such as a hydrocarbon group having 1 to 10 carbon atoms, can be included in the described mixture. The described components can be employed in any suitable amount but desirably will be in, or close to, the following amounts by weight:

| Ingredient | Amount by Weight |
|---|---|
| A | 60–95 |
| B | 5–40 |
| C | 0–20 |

More specifically useful are the compositions obtained as indicated above in which ingredient B has the formula $(CH_3O)_3 Si(CH_2)_3NHCH_2CH_2NH_2$, and particularly those in which ingredient C is zero or is a minimal amount of 1% in the amino functional polydimethylsiloxane composition. U.S. Pat. No. 3,836,371 is especially relevant in that it discloses such compositions. Furthermore, it appears that DC 536 contains about 75% of ingredient (A) having a viscosity of about 40 cs, 15% of ingredient (B) and 10% of ingredient (C). Similarly, DC 531 appears to be about 50% aliphatic solvents and isopropyl alcohol and about 50% active ingredients of which 90% is ingredient (A) having a viscosity of 400 cs and 10% is ingredient (B).

It is to be understood that the term "amino functional polydimethylsiloxane" as used herein refers to the mixture of ingredients A and B and the optional ingredient C, as well as the copolymers which are formed from such mixtures at room temperature in the presence of air and in the absence, or presence, of an acid.

The amino functional polydimethylpolysiloxanes useful in the process of this invention are generally liquids at 25° C. However, at that temperature many of them are too viscous for application to a bottle since the resulting coating will be too thick, costly and, most importantly, unstable. If the amino functional polydimethylpolysiloxane is added neat, or undiluted, to a natural bottle surface the resulting coating will be too thick, wasteful of material and be unsatisfactory. A thick coating will have a rapidly cured outer surface or skin and an uncured layer beneath it. Such a coating will not adhere to the bottle and it will be readily stripped off. Accordingly, it is desirable to apply the amino functional polydimethylsiloxane in the form of a composition which permits the application of a very thin layer of the coating to a bottle.

It has been found, according to a second aspect of the invention, that the amino functional polydimethylsiloxane can be applied in a thin layer to a bottle surface in a suitable solvent or in the form of an aqueous emulsion. The coating, in general, usually need not weigh more than 250 mg.

Typical suggested organic solvents which may be used to dilute the amino functional dimethylpolysiloxanes are alcohols (methanol, ethanol, isopropyl alcohol, etc.), chlorinated solvents (chloroform, carbon tetrachloride, methylene chloride, perchloroethylene, etc.), ethers (diethyl ether, dioxane, furan, etc.), hydrocarbons (benzene, toluene, petroleum ether, etc.), and many others. It is not intended to limit the scope of the application to just the few solvents which are mentioned here. It should also be noted that mixtures of solvents may of course be used, and water may be added to the solvents if desired if such mixtures do not adversely affect the performance of the active compounds. Presently, ethanol is considered the solvent of choice when the coating is to be applied to returnable beer, ale and malt liquor bottles since it is the most compatible solvent, besides water, in a brewery. Also, it does not introduce into a brewery a solvent which may adversely affect foaming of the beverage. The amount of solvent used will depend on the solubility of the siloxane in it. In general, about 1 to 50% of a siloxane of the described type will be dissolved or dispersed in the solvent.

In addition to the amino functional polydimethylsiloxane, a solvent solution thereof can also desirably include N-(2-aminoethyl)-3-aminopropyltrimethoxysilane (Z-6020; Dow Corning) in an amount of from about 0.1 to about 150 percent by weight of the siloxane content in the mixture.

The amino functional polydimethylpolysiloxanes can also be applied to bottles in the form of aqueous emulsions. However, according to another aspect of the invention an acceptable nonionic surfactant is employed in the formation of suitable aqueous emulsions to adequately disperse the siloxane in water, the result of which is the formation of novel, unobvious compositions. Not only does the nonionic surfactant aid in forming the emulsion but it facilitates application of a thin uniform coating by reducing surface tension. Among the nonionic surfactants which can be employed are (1) condensation products of 1 mole of phenol with about 5-30 moles of ethylene oxide, (2) condensation products of 1 mole of an alkyl phenol having up to about 15 carbon atoms in the alkyl group with about 5-30 moles of ethylene oxide, (3) condensation products of 1 mole of an alkyl amine having about 10-20 carbon atoms in the alkyl group with about 5-50 moles of ethylene oxide, (4) condensation products of 1 mole of an aliphatic alcohol having about 10-20 carbon atoms in the alkyl group with about 5-50 moles of ethylene oxide, (5) condensation products of 1 mole of a polypropylene glycol containing about 10-50 propylene oxide units with about 4-150 moles of ethylene oxide, and (6) mixtures thereof.

To form the novel emulsion, about 0.1 to 10% by weight of a nonionic surfactant can be used based on the total weight of the emulsion which can contain about 1 to 20% by weight of the siloxane. Standard procedures can be used to form the emulsions.

Regardless of whether the siloxane is applied to a bottle as a solvent solution, dispersion or in the form of an aqueous emulsion, it is desirable to include a quaternary surfactant therein. This is because such a surfactant appears to increase the rate of adherence, thus providing a lubrious surface within seconds after application.

Among the quaternary surfactants which can be used as described are the alkyl and the aralkyl quaternary ammonium salts. Preferred compounds of this type contain one or two long chain alkyl groups, such as those having from 8 to 16 carbon atoms, and two or three alkyl groups having from 1 to 6 carbon atoms. Some such specific surfactants which can be used are dicocodimethyl ammonium chloride (Arquad 2C-75) and trimethylhexadecyl ammonium chloride (Arquad 16-50).

The amount of quaternary surfactant used in the compositions is not narrowly critical. However, the resulting total solution, dispersion or emulsion can contain about 0.1 to 10% by weight of quaternary surfactant.

It has also been found advantageous at times to include a suitable fatty acid in solvent solutions or dispersions of the siloxane, or to include a suitable fatty acid salt or soap in aqueous emulsions of the siloxanes. The resulting novel compositions when applied to bottles lead to highly suitable coatings on bottles having good scuff resistant properties.

Among the fatty acids which can be included in organic solvent solutions or dispersions of the siloxanes are aliphatic carboxylic acids of the formula R-COOH wherein R is an alkyl radical of 10 to 22 carbon atoms which may be straight or branched, saturated or unsaturated. These long chain carboxylic acids may be used in pure form or as mixtures. Some convenient mixtures of carboxylic fatty acids which can be used are available commercially from Emery Industries under the tradenames Emery 213; 622; 633; and 882.

The amount of fatty acid used can vary considerably. In general, however, it will be used in an amount of from about 0 to 100%, and generally in the range of about 5 to 100%, by weight of the siloxane used. Compositions will generally contain 0–50%, and a minimum of 0.1%, of the fatty acid or soap thereof.

When the siloxane is to be applied as an emulsion to bottles, the fatty acid is desirably converted to a soap, such as a triethanolamine salt, to facilitate emulsifying the fatty acid ingredient. Any suitable base can be used to produce the salt or soap.

The composition of products produced as described above can be summarized as shown in the following tables, with Table A constituting solvent based products, Table B aqueous based emulsions and Table C constituting products using N-(2-aminoethyl)-3-aminopropyltrimethoxysilane (Z-6020; Dow Corning) with the siloxane.

TABLE A

| Ingredient | Percent by Weight |
| --- | --- |
| Siloxane | 0.1–50 |
| Organic Solvent | 5–49.9 |
| Nonionic surfactant | 0–10 |
| Quaternary surfactant | 0–10 |
| Fatty carboxylic acid | 0–50 |

TABLE B

| Ingredient | Percent by Weight |
| --- | --- |
| Siloxane | 0.1–99.9 |
| Nonionic surfactant | 0.1–5 |
| Quaternary surfactant | 0–10 |
| Fatty carboxylic acid soap | 0–50 |
| Water | 5–94.7 |

TABLE C

| Ingredient | Percent by Weight |
| --- | --- |
| Siloxane | 0.1–99.5 |
| Z-6020 | 0.1–50 |
| Nonionic surfactant | 0–10 |
| Quaternary surfactant | 0–10 |
| Organic solvent | 0.5–99.8 |

The products as summarized in Tables A, B and C include both use solutions, as well as concentrates which can be diluted to use solutions. Use solutions or dispersions for application to bottles will generally contain about 0.01 to 10% by weight of the siloxane. However, it is generally desirable to have a minimum of 0.5%, desirably 2%, by weight of the siloxane in the use solution or dispersion. As to Table C, the amount of Z-6020 will generally not exceed 150% of the siloxane present.

Each of the products broadly summarized in Tables A, B and C desirably contains a minimum of 0.3% by weight of nonionic surfactant. Furthermore, it is generally desirable, even though not essential, to include a minimum of 0.3% by weight of quaternary surfactant. With regard to the fatty acid and/or soap thereof, the minimum amount added, if any is added, will generally be 0.5% by weight.

Products as described above are applied to returnable bottles each time they are processed through a filling line but after the bottles have been washed with caustic solution. The caustic solution removes any prior coating of the type described herein on the bottle and cleans it. The coating can then be applied before or after the bottle is filled.

In accordance with the present teachings, returnable bottles are coated each time they are processed through the filling line. This is accomplished by dipping the bottles in, or spraying or wiping on the bottles, a dilute solution or dispersion of the product as hereinabove described. The coating cures rapidly following application to the bottles. The coating is applied primarily to those portions of the bottles which contact similar portions on adjoining bottles as they move on a conveyor line. The coating acts on the bottles to prevent scratching and scuffing and reduces the friction between the bottles during processing. It remains on the bottles until they return to the bottling hall. The nature of the coating is such that it completely dissolves in the bottlewash caustic detergent used to clean the bottles, and clean bottles therefore emerge from the bottlewasher to be coated again. The coating may be applied to the whole float, i.e., all bottles passing through the processor, both returned scuffed bottles as well as new bottles. Although the coating applied, being transparent, does not hide the scuffs already present, the coating does reduce further deterioration of the bottle due to further scuffing.

Some of the many advantages to this method of improving the performance of bottles are:

1. It is well known that in order for a permanent bottle coating to be successful, it must be durable enough to last longer than the average number of trips which a bottle might make in its lifetime.

Thus, in the case of a recyclable beer bottle, the permanent coating should be able to last for about 60 trips. It is also well known that many bottles break after many fewer trips than 60; thus, much of the cost of a permanent coating is spent to protect bottles which are lost after very few trips.

One advantage of a single trip coating as described in the present teachings is that only those bottles which are being processed and filled are coated. The total cost of treatment of the bottle over its lifetime is therefore much diminished.

2. Although many coatings and coating procedures have been described over the years, none is as simple or easy to implement as that disclosed here. Many of the prior art coatings require a hot end treatment of the glass with a titanium or tin compound whereas others demand a special chemical primer and/or heat curing or curing by radiation. The coatings described herein can be applied directly to glass without prior treatment of the glass provided the glass surface is clean, and may be readily applied to bottles which may be damp without being absolutely dry. One of the prime advantages of the present invention is that the application and curing of the coating may be carried out in a conventional bottling hall.

3. It is well known that many of the steps in the filling of beverage bottles involves spraying or flooding of the bottles with water. This occurs on the bottling line, in the pasteurizer, etc. It is an advantage of this process that all of the coatings described herein are resistant to flooding of the bottles by water. This is in spite of the fact that the coatings are readily removed when the bottle is immersed in a caustic detergent solution.

4. There is a great variety in the method of application of the present coatings to the bottles. The bottles may be dipped in the solutions, or the solution may be sprayed or wiped on. There is therefore great flexibility of design in any applicator used to coat the bottles on the production line.

5. The coatings are transparent and not readily detectable apart from the improvement in properties mentioned above. Thus, the coatings do not interfere with the aesthetic design or appearance of the bottles.

6. It will be appreciated that in a process such as is described herein, where bottles are coated on a production line, dispersion of the coating material in water is preferred to dispersion of the material in organic solvents. Organic solvents are often toxic or flammable and special procedures are required to eliminate their vapors. While some of the coatings described herein are dissolved in organic solvents, others may be dissolved or dispersed in water before being applied to the bottles, and still provide effective performance.

7. By another important aspect of the present concept, it has been further found that some of the components perform better in combination than does either by itself.

8. The coating provides a low coefficient of friction that facilitates the bottle filling production process.

EXPERIMENTAL

Two test procedures are outlined below which form the basis of the data for the test results.

(a) An instrument called a line simulator available from American Glass Research Co. was used to measure the anticipated scuffing and wear of bottles in the production line.

(b) The tilt table test was used to measure the title angle, and hence the coefficient of friction, between any three bottles before and after coating.

The AGR Line Simulator

In the operation of this equipment, the bottles are allowed to abrade each other by rotation on a turntable for various periods of time. A spring in the instrument allows the bottles to impact each other at controllable pressures. This provides a reasonable simulation of abrasion and contact which bottles make during the various stages in a bottling line. The performance of the coatings were evaluated in the following way:

(1) Clean, new bottles, were put into the line simulator and the line simulator was run for various periods of time up to 30 minutes.

(2) After various periods of time (1,3,5 minutes etc.), some of the bottles were removed from the simulator, dried and examined.

(3) After the final bottles were removed, all were examined and retained for future reference. The appearance of the bottles, clearly discernable to the eye, showed increasing evidence of scuffing and wear the longer the bottles were subjected to the line simulation.

(4) Bottles which had been coated in accordance with the present invention were then put onto the line simulator and subjected to the same treatment.

(5) In a similar manner as before, the coated bottles were removed from the line simulator, dried and examined for scratches, abrasion and so on.

(6) A direct comparison between coated and uncoated bottles was made as subsequently described:

It is possible, quite arbitrarily, to describe a certain visual appearance of uncoated bottles as being unsatisfactory. Thus, uncoated bottles on the line simulator may be found to reach an unsatisfactory appearance after say, 5 minutes. A coated bottle tested on the simulator will invariably take a longer period of time to reach the same degree of scuffing which is considered unsightly. The ratio of the period of time required for a coated bottle to that required for an uncoated bottle to reach the same degree of scuffing can be called the protection factor (P.F.). Thus, if an uncoated bottle is considered unsightly after 5 minutes, while a coated bottle requires 10 minutes on the line simulator, to acquire the same appearance, then the protection factor is 10/5=2.0. In the following examples, all test work was carried out under wet conditions and all data presented will be in terms of the P.F.

The line simulator can be operated as described with the bottles dry, or it can be operated with a stream of water flowing over the bottles. A wet run of this type is able to distinguish those coatings which are capable of resisting water from those which are not.

THE TILT TABLE

The tilt table is an instrument, which is well known in the art, to measure interbottle friction. A pyramid of three bottles is tilted along the long axis of the bottles until the point is reached where the top bottle slides freely over the other two. The angle of the bottles to the horizontal at which this occurs is called the tilt angle, and the tangent of this angle is the coefficient of friction between the bottles.

The application of the above described siloxane-containing products to glass bottles in accordance with this invention may be achieved by one or more of the following methods after the bottles have been subjected to an alkali-containing detergent wash solution. The bottles may be either completely dry or incompletely dry, i.e. damp.

(1) The bottle may be either dipped into an aqueous or organic solvent solution or dispersion of the materials.

(2) The bottle may be sprayed with an aqueous or organic solvent solution or dispersion of any one of the materials.

(3) The bottles may be wiped with a sponge, cloth or felt which is saturated with an aqueous or organic solvent solution of any one of the materials.

(4) The bottle may be dipped in or sprayed with, or wiped with a cloth, felt or sponge, saturated with an emulsion of any one of the materials in water. Such emulsions may be prepared by mixing the materials in nonionic surfactants and other emulsifying agents which are compatible with the chemicals and then dispersing this mixture in water. Methods of preparing emulsions of nitrogenous compounds are well known in the art and no specifics on such processes are deemed to be necessary.

The following non-limiting examples are provided to illustrate the invention.

EXAMPLE 1

For each experiment, five new Canadian-style beer bottles were thoroughly washed in hot running water for 15 minues and then dried. Solutions of the compounds tested were made up in isopropanol to the concentrations given in the table below.

Groups of five bottles were dipped in each solution and left in the solution between 5 and 15 seconds before being withdrawn. The bottles were then allowed to drain and dry in the air for 3 minutes before being put into the line simulator previously discussed for testing. The line simulator was then operated for 2, 5, 10 and 20 minutes. At each interval the bottles were removed and compared visually with the set of control bottles which had previously been run on the line simulator without being coated. As previously described, the Protection Factor (P.F.) is calculated by dividing the time taken for a coated bottle to become unsightly by the time taken for an uncoated bottle to become unsightly. In these experiments, control bottles were found to become unacceptably scuffed after 7 minutes on the line simulator.

The results given below were all obtained under wet conditions with both the coated bottles and the uncoated bottles being exposed to a stream of water while in the line simulator.

The tilt angle of the coated bottles was determined before testing on the line simulator. The table below gives the P.F., and inter bottle friction (expressed as tilt angle and coefficient of friction $\mu$) obtained for some representative solutions.

| Compound | Solvent | Concentration (%) | Protection Factor | Tilt Angle | $\mu$ |
|---|---|---|---|---|---|
| Amino functional polydimethylsiloxane copolymer (DC-536) | Isopropanol | 2.0 | 12.0 | 3.4° | 0.06 |
| Amino functional polydimethylsiloxane copolymer (DC-531) | Isopropanol | 2.0 | 12.0 | 1.2° | 0.02 |

EXAMPLE 2

Organic Solvent Solutions: Deposition by Wiping

In this experiment, deposition was made by methods other than dipping. The same procedure was followed to evaluate results. The results illustrate that good protective bottle coating can be made by spraying or wiping of the solutions onto the bottle. The formulation used in this test is a mixture of an amino functional polydimethylsiloxane copolymer (DC-536) and oleic acid dissolved in isopropyl alcohol which mixture was 2% active, (i.e., specifically contained 1.4% by weight of the polysiloxane and 0.6% by weight of oleic acid in isopropyl alcohol).

| Application Method | P.F. |
|---|---|
| Bottle wiped once with paper towel saturated with solution | 4.4 |
| Bottle wiped once with sponge saturated with solution | 6.7 |
| Bottle wiped once with felt roller saturated with solution | 6.7 |
| Bottle sprayed with solution using hand applicator | 6.4 |

EXAMPLE 3

Emulsions

In these tests, the emulsions were prepared from the compounds under study in the conventional manner. The nitrogenous compound was first mixed with an emulsifying agent and distilled water was slowly added to the mixture with vigorous stirring. The emulsifying agent was selected to provide a uniform stable emulsion. Five bottles were coated as before by immersion in each emulsion under study and subjected to testing as previously described.

(a) Emulsion A

This emulsion was prepared as described using the following components. The total active concentration of the composition tested was 5%.

| | |
|---|---|
| Mixture of long chain ($C_{10}$ to $C_{22}$) carboxylic acids (Emery 213) | 2.40% |
| Amino functional polydimethylsiloxane copolymer (DC-536) | 1.60 |
| Monoethanolamine | 1.00 |
| Distilled water | 95.00 |
| | 100.00% |

The coating was tested as before, the bottles being dipped in the solution.
Protection Factor: 3.1
Tilt Angle: 1.7°
$\mu$: 0.03

(b) Emulsion B

The compositions and performance of this emulsion tested as before were:

| | |
|---|---|
| Mixture of long chain ($C_{10}$ to $C_{22}$) carboxylic acids (Emery 213) | 2.1% |
| Amino functional polydimethylsiloxane copolymer (DC-536) | 1.4 |
| Triethanolamine | 1.5 |
| Distilled water | 95.0 |
| | 100.0% |

Protection Factor: 3.1
Tilt angle: 1.7°
$\mu$: 0.03

(c) Emulsion C

The composition and performance of this emulsion is as follows:

| | |
|---|---|
| Mixture of long chain ($C_{10}$ to $C_{22}$) carboxylic acids (Emery 213) | 2.45% |
| Amino functional polydimethylsiloxane copolymer (DC-536) | 1.60 |
| Diethanolamine | 0.95 |
| Distilled water | 95.00 |
| | 100.00% |

Protection Factor: 2.7
Tilt Angle: 1.7°
$\mu$: 0.03

(d) Emulsion D

This emulsion was prepared as described above using the following components:

| | |
|---|---|
| Mixture of long chain ($C_{10}$ to $C_{22}$) carboxylic acids (Emery 622) | 2.0% |
| Amino functional polydimethylsiloxane copolymer (DC-536) | 2.0 |
| Triethanolamine | 1.0 |
| Distilled water | 95.0 |
| | 100.0% |

The bottles were dipped into the solution and the coating tested as previously outlined to determine the Protection Factor (P.F.) tilt angle and coefficient of friction with the following results being obtained:
Protection Factor: 5.6
Tilt Angle: 1.7°
$\mu$: 0.03

(e) Emulsion E

This emulsion was prepared in a similar manner and tested as previously described.

| | |
|---|---|
| Mixture of long chain ($C_{10}$ to $C_{22}$) carboxylic acids (Emery 882) | 2.4% |
| Amino functional polydimethylsiloxane copolymer (DC-536) | 1.6 |
| Triethanolamine | 1.0 |
| Distilled water | 95.0 |
| | 100.0% |

Protection Factor: 5.6
Tilt Angle: 1.1°
$\mu$: 0.02

(f) Emulsion F

This emulsion was prepared and tested as previously described. Nonylphenoxypolyethyleneoxy ethanol surfactants were added. These surfactants are known under the trademark IGEPAL CO and are available from Chemical Developments of Canada Limited. The particular materials which were employed were the nonionic surfactants IGEPAL CO 530 and CO 710, both of which are nonylphenoxypolyethyleneoxy ethanol which contain 6, and 10 to 11, moles of ethylene oxide respectively.

| | |
|---|---|
| IGEPAL CO 530 | 3.6% |
| IGEPAL CO 710 | 5.4 |
| Amino functional polydimethylsiloxane copolymer (DC-536) | 1.0 |
| Distilled water | 90.0 |
| | 100.0% |

Protection Factor: 6.7
Tilt Angle: 1.7°
$\mu$: 0.03

EXAMPLE 4

Some of the amino functional polydimethylsiloxanes described above have been found to perform more effectively when combined with carboxylic fatty acids. The following tests were carried out by dissolving the fatty acid in isopropanol in different proportions, but the same total amount, and using this solution, bottles were coated by the dipping method. Testing was carried out as previously described and the results are given below:

A. Amino functional polydimethylsiloxane copolymer (DC-536)
Fatty Acid: Mixture of long chain ($C_{10}$—$C_{22}$) carboxylic acids (Emery 633)
Solvent: Isopropyl alcohol (IPA)
Percentage Ingredient in IPA

| DC-536 | Emery 633 | P.F. |
|---|---|---|
| — | 2.0 | 1.4 |
| 0.4 | 1.6 | 8.4 |
| 0.8 | 1.2 | 10.2 |
| 1.0 | 1.0 | 12.0 |
| 1.2 | 0.8 | 14.4 |
| 1.6 | 0.4 | 14.4 |
| 2.0 | — | 12.0 |

B. Amino functional polydimethylsiloxane copolymer (DC-536)
Fatty Acid: Mixture of long chain ($C_{10}$–$C_{22}$) carboxylic acids (Emery 213)
Solvent: Trichloroethylene (TCE)
Percentage Ingredient in TCE

| DC-536 | Emery 213 | P.F. |
|---|---|---|
| — | 2.0 | 4.0 |
| 1.2 | 0.8 | 13.2 |
| 2.0 | — | 11.6 |

EXAMPLE 5

A major factor with respect to one trip coating is that the coating should be completely removable. The coatings of the present invention meet this requirement and such coating materials are completely removed when the bottles are washed in a commercial bottle washer.

Bottles which had been coated as outlined in Examples 1 to 4 were subjected to a bottlwashing solution which had been prepared by dissolving 5.0% sodium hydroxide and 2.0% sodium gluconate in water. This solution was heated to 175° F. and the previously coated bottles were immersed in this hot caustic solution for about 20 minutes, rinsed thoroughly, dried and examined. The bottles were then tested on the tilt table to determine the tilt angle and coefficient of friction ($\mu$) as removal of the coating would restore the high coefficient of friction of clean glass. The tilt angle of clean glass (uncoated) is about 35° with a $\mu$ value of 0.71. It would be expected that the tilt angle and $\mu$ value of coated bottles should return to the values of the clean bottles after the caustic washing if the washing completely removes the coating.

Various coating compositions were applied to bottles and the bottles were subsequently washed in the prepared caustic solution with the following results being obtained.

| (a) | Coating A | |
|---|---|---|
| | Amino functional polydimethylsiloxane copolymer (DC-536) | 1.2% |
| | Mixture of long chain ($C_{10}$–$C_{22}$) carboxylic acids (Emery 633) | 0.8 |
| | Isopropyl alcohol | 98.0 |
| | | 100.0% |

| Coated Bottle | | After Caustic Wash | |
|---|---|---|---|
| Tilt Angle | 1.1° | Tilt Angle | 34° |
| $\mu$ | 0.02 | $\mu$ | 0.67 |

| (b) | Coating B | |
|---|---|---|
| | Amino functional polydimethylsiloxane copolymer (DC-536) | 1.4% |
| | Mixture of long chain ($C_{10}$–$C_{22}$) carboxylic acids (Emery 213) | 2.1 |
| | Triethanolamine | 1.5 |
| | Distilled water | 95.0 |
| | | 100.0% |

| Coated Bottle | | After Caustic Wash | |
|---|---|---|---|
| Tilt Angle | 1.7° | Tilt Angle | 36° |
| $\mu$ | 0.03 | $\mu$ | 0.73 |

In all tests the bottles were clean and transparent both prior to and after the caustic wash treatment.

From the above test results it is readily apparent that the applied coatings are completely removed by the caustic solution treatment. It was further noted that there was no visible evidence of residual or degraded coatings and that the bottles were not in any way visibly damaged.

EXAMPLE 6

Quaternary ammonium compounds have been found to accelerate the rate of adherence of the applied coating when mixed with an amino functional polydimethylsiloxane copolymer. The following emulsions were blended according to the formulations given. Bottles were coated and their coefficient of friction was tested after ½, 1 and 2 minutes of curing at ambient temperature. the results were compared to those of other emulsions tested under identical conditions. "Instant lubricity" was noted in these coatings containing quaternary ammonium compounds.

| (a) Emulsion G | |
|---|---|
| Amino functional polydimethylsiloxane copolymer (DC-536) | 2.0% |
| Dicocodimethyl ammonium chloride (Arquad 2C-75) | 3.6 |
| Nonyl phenol ethoxylate (Alkasurf NP-11) | 4.4 |
| Distilled water | 90.0 |
| | 100.0% |

Protection Factor: 4.0

| (b) Emulsion H | |
|---|---|
| Amino functional polydimethylsiloxane copolymer (DC-536) | 1.0% |
| Nonyl phenol ethoxylate (Alkasurf NP-8) | 7.3 |
| Trimethylhexadecyl ammonium chloride (Arquad 16-50) | 1.7 |
| Distilled water | 90.0 |
| | 100.0% |

Protection Factor: 4.0

| Coefficient of Friction as a Function of Time: | | | | |
|---|---|---|---|---|
| Curing Time, minutes | Emulsion G | Emulsion H | Emulsion Ex 4B | Emulsion Ex 4F |
| ½ | 0.05 | 0.04 | 0.46 | 0.58 |
| 1 | 0.05 | 0.03 | 0.45 | 0.58 |
| 2 | 0.05 | 0.03 | 0.44 | 0.58 |
| 3 | 0.05 | 0.03 | 0.06 | 0.56 |
| 6 | 0.04 | 0.02 | 0.06 | 0.07 |

EXAMPLE 7

Another amino functional polydimethylsiloxane copolymer suitable for use in the invention is DC-478, available from Dow Corning. DC-478 has been used in the leather industry to improve water resistance of leather. DC-478 is 50% silicone solids in isopropanol. This product was tested on bottles in a 1% active solution in a 1:1 ethanol/water mixture with the following results:

Protection Factor: 6.4
Tilt Angle: 1.1°
$\mu$: 0.02

DC-478 was also tested in admixture with DC-536 according to the following formulation with the indicated results:

| DC-478 | 1.00% |
|---|---|
| DC-536 | 0.50 |
| Ethanol | 49.25 |
| $H_2O$ | 49.25 |
| | 100.00% |

Protection Factor: 6.0
Tilt Angle: 1.1
$\mu$: 0.02

The coatings using DC-478 alone, or combined with DC-536, are clean and non-greasy when cured and accept labels readily. Good label adhesion is, of course, highly desirable in the beverage and bottling industries.

EXAMPLE 8

Another coating suitable for bottles constitutes a mixture of DC-536 with N-(2-aminoethyl)-3-aminopropyltrimethoxysilane (Z-6020, Dow Corning). A suitable mixture has been prepared as follows and used to coat bottles with the following results:

| DC-536 | 1.0% |
|---|---|
| Z-6020 | 0.5 |
| Ethanol | 49.25 |
| $H_2O$ | 49.25 |
| | 100.00% |

Protection Factor: 5.0
Tilt Angle: 5.7°
$\mu$: 0.10

When DC-536 is used without Z-6020, labels do not adhere as well to the bottles as would be desired. However, when DC-536 and Z-6020 are used together the resulting coating has very good label adhesion properties.

Although the invention has been described with reference to the preferred embodiments, it is to be understood that changes and modifications may readily be made by those skilled in the art without deviating from the spirit and scope of the present invention defined by the appended claims.

What is claimed is:

1. A composition for coating returnable glass bottles comprising about 0.5–50% by weight of an amino functional polydimethylsiloxane, about 5 to 49.9% by weight of an organic solvent, about 0.1 to 10% by weight of a nonionic surfactant, about 0–10% by weight of a quaternary surfactant and about 0–50% by weight of a fatty carboxylic acid having 10 to 22 carbon atoms or a mixture thereof, said composition containing a minimum of 0.1% quaternary surfactant or a minimum of 0.1% fatty carboxylic acid or of both.

2. A composition for coating returnable glass bottles comprising about 0.5–50% by weight of an amino functional polydimethylsiloxane, about 0.3 to 10% by weight of a nonionic surfactant, about 0 to 10% by weight of a quaternary ammonium surfactant, about 0–50% by weight of a fatty carboxylic acid soap, and about 5–94.7% by weight of water, said composition containing a minimum of 0.1% quaternary surfactant or a minimum of 0.1% fatty carboxylic acid or of both.

3. A composition according to claim 1 or 2 in which the amino functional polydimethylsiloxane is formed from (A) a hydroxyl endblocked polydimethylsiloxane and (B) a compound of the formula $(CH_3O)_3Si(CH_2)_3NHCH_2CH_2NH_2$.

4. A composition according to claim 20 including $(CH_3O)_3SiCH_3$.

* * * * *